United States Patent
Portet et al.

(10) Patent No.: US 10,486,376 B2
(45) Date of Patent: Nov. 26, 2019

(54) METHOD FOR PREPARING THE LAYING UP AND FORMING OF A COMPOSITE PREFORM

(71) Applicant: DAHER AEROSPACE, Saint Julien de Chedon (FR)

(72) Inventors: Stéphanie Portet, Le Loroux Bottereau (FR); Julie Vaudour, La Chevrolière (FR)

(73) Assignee: DAHER AEROSPACE, Saint Julien de Chédon (FR)

( * ) Notice: Subject to any disclaimer, the term of this patent is extended or adjusted under 35 U.S.C. 154(b) by 309 days.

(21) Appl. No.: 15/536,114

(22) PCT Filed: Dec. 21, 2015

(86) PCT No.: PCT/EP2015/080872
§ 371 (c)(1),
(2) Date: Jun. 14, 2017

(87) PCT Pub. No.: WO2016/097422
PCT Pub. Date: Jun. 23, 2016

(65) Prior Publication Data
US 2017/0348922 A1    Dec. 7, 2017

(30) Foreign Application Priority Data
Dec. 19, 2014 (FR) ..................... 14 62877

(51) Int. Cl.
*B29C 70/54* (2006.01)
*B29B 11/16* (2006.01)
*B29D 99/00* (2010.01)
*B29C 70/30* (2006.01)
*B29K 101/12* (2006.01)
*B29L 31/30* (2006.01)
*B33Y 10/00* (2015.01)

(52) U.S. Cl.
CPC ............ *B29C 70/541* (2013.01); *B29B 11/16* (2013.01); *B29C 70/30* (2013.01); *B29C 70/543* (2013.01); *B29D 99/0014* (2013.01); *B29K 2101/12* (2013.01); *B29L 2031/3082* (2013.01); *B33Y 10/00* (2014.12)

(58) Field of Classification Search
None
See application file for complete search history.

(56) References Cited

U.S. PATENT DOCUMENTS

2006/0172636 A1* 8/2006 Bech ................. B29B 11/16
                                                                  442/1
2010/0096076 A1    4/2010 Soccard

FOREIGN PATENT DOCUMENTS

FR    2 912 077 A1    8/2008
FR    2 989 308 A1    10/2013

* cited by examiner

*Primary Examiner* — Barbara J Musser
(74) *Attorney, Agent, or Firm* — Im IP Law; C. Andrew Im; Chai Im

(57) ABSTRACT

A method for making a first ply for laying up a fibrous preform on a tool. An attachment zone is made on the laying up surface of the tool. The zone is integral with the laying up surface of the tool. A polymer is deposited by additive manufacturing on the surface of the tool. The polymer deposit passes on the attachment zone. The first ply is laid up by activating the tackiness of the polymer deposited using additive manufacturing, so as to make the deposited fibers adhere to the material deposited by additive manufacturing.

10 Claims, 1 Drawing Sheet

METHOD FOR PREPARING THE LAYING UP AND FORMING OF A COMPOSITE PREFORM

RELATED APPLICATIONS

This application is a § 371 application from PCT/EP2015/080872 filed Dec. 21, 2015, which claims priority from French Patent Application No. 14 62877 filed Dec. 19, 2014, each of which is incorporated herein by reference in its entirety.

FIELD OF THE INVENTION

The invention relates to a method for preparing the laying up and forming of a composite preform. The invention is particularly but not exclusively suitable for the automatic laying up of a composite preform by placing fibers pre-impregnated with thermoplastic material, and the method according to the invention is suitable for laying up dry fibers or fibers pre-impregnated with thermosetting polymer.

The method according to the invention is also suitable for making a preform for a stiffened panel, laid up over a set of stiffeners held in the tool.

BACKGROUND OF THE INVENTION

Laying up by placing fibers makes it possible to make a formed composite part, for example a portion of an aircraft fuselage, reinforced by continuous fibers. The deposition of the first ply is always a problem, particularly when the fiber impregnation polymer is not sufficiently tacky to make the fibers adhere to the tool and allow the application of the tension required for removal to the fibers. A variety of solutions are known in the prior art, but these solutions require operations for the manual preparation of the tool. Further, most solutions of the prior art are adapted for the automatic laying up of a preform preferably on a surface with a convex shape. The solutions of the prior art, particularly those that use removal fabric, are complex to implement on a non-developable form, as said fabric tends to crease in such a case.

Document FR 2 989 308 describes a method for attaching a first ply while laying up a composite fibrous preform with a thermoplastic matrix, which method comprises the installation of ceramic fibers impregnated with thermoplastic resin on the laying up surface of the tool. The installation of individual fibers makes it possible to follow complex tool shapes, particularly those that are not developable. However, this solution of the prior art is difficult to automate.

OBJECT AND SUMMARY OF THE INVENTION

The invention aims to remedy the drawbacks of the prior art and relates, to that end, to a method for making a first ply for laying up a fibrous preform on a tool, which method comprises the steps of:
  a. making a zone known as the attachment zone on the laying up surface of the tool, which zone is integral with the surface of the tool;
  b. depositing polymer by additive manufacturing on the surface of the tool, wherein said deposit passes on the attachment zone;
  c. laying up the first ply by activating the tackiness of the polymer deposited using additive manufacturing, so as to make the deposited fibers adhere to the material deposited by additive manufacturing.

Thus, the use of an additive manufacturing process for depositing the film that holds the fibers makes it possible to cover the laying up surface of the tool regardless of the shape of that surface, and to deposit the film automatically. The thickness of the material deposited by additive manufacturing is very small, depending on the minimum depositing thickness allowed by the additive manufacturing technique used, so that the layer adhering to the fibrous preform after laying up does not need to be detached for the final application.

The invention can be implemented advantageously in the embodiments described below which may be considered individually or in any technically operative combination.

In an embodiment of the method according to the invention, the attachment zone is mechanically connected to the mold and comprises a surface suitable for the adhesion of the polymer deposited by additive manufacturing. This attachment mode of the attachment film of the first ply is the most stable.

In another embodiment, the attachment zone is materialized by pressure-sensitive adhesive. This attachment mode of the attachment film of the first ply is the most economical.

Advantageously, the polymer deposited by additive manufacturing is thermoplastic polymer. This type of material is adapted to the powder melt method of additive manufacturing, which allows precise control over the quantity of material deposited.

In this embodiment, the activation in step (c) of the tackiness of the polymer deposited by additive manufacturing in step (b) is carried out by heating during laying up.

Thus, by selecting the deposited polymer appropriately, the heating temperature for gluing the laid up fibers to the attachment film is maintained within a compatible range so as to not lead to any stress in the preform.

Advantageously, the laying up surface of the tool does not adhere to the polymer deposited by additive manufacturing. Thus, the preform is separated from the tool merely by detaching the attachment film of the first ply from the attachment zone, which has a small surface area.

In a first implementation of the method according to the invention, the laying up surface of the tool is convex and the attachment zone is located at the top of the tool. This implementation makes it easier to control the tension of the fibers laid up during the laying up operation. The attachment film of the first ply remains attached to the concave face of the preform after laying up.

In another embodiment of the method according to the invention, the laying up surface of the tool is concave and the attachment zone is located at the bottom of the tool. In this embodiment, the attachment film of the first ply remains joined to the preform after laying up, on the convex face of said preform.

Advantageously, the polymer deposited in step (b) is deposited in strips organized to form a net on the surface of the tool. Thus, the quantity of material deposited in step (b) is reduced.

In a particular embodiment suitable for manufacturing the preform of a stiffened panel, the method according to the invention uses a tool with a recess for introducing a stiffener, the sole of which projects out in relation to the laying up surface, and the method comprises a step of:
  d. using additive manufacturing in order to create a gradual geometric transition zone between the top of the sole of the stiffener and the laying up surface of the tool.

Thus, the transition zone made by additive manufacturing allows improved matching of form between the laid up preform and the stiffeners and the adhesion of fibers on the edges of the stiffener, thus avoiding the creation of a hollow near said stiffener, more even tension of fibers while laying up and reduced formation of facets in the preform.

BRIEF DESCRIPTION OF THE DRAWINGS

The invention is described below in its preferred embodiments, which are not limitative in any way, and by reference to FIGS. 1 and 2, wherein.

DETAILED DESCRIPTION OF THE EMBODIMENTS

Figure 1:
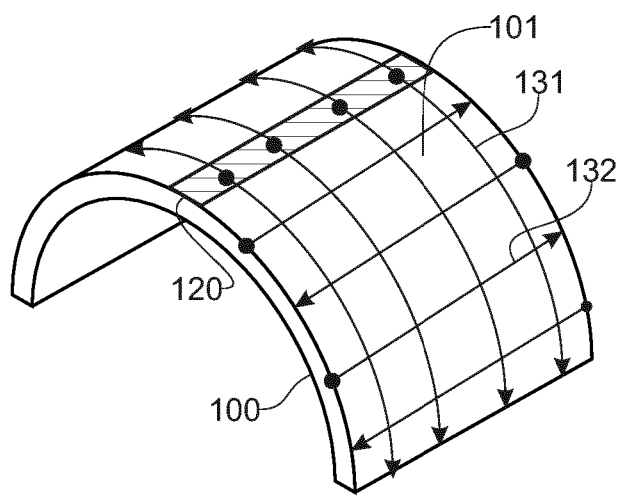
FIG. 1 is a schematic perspective view of the different steps for implementing an exemplary embodiment of the method according to the invention using a convex tool.

In FIG. 1, the method according to the invention uses a forming tool (100). In this exemplary implementation, the laying up surface (101) of the tool is a convex surface. In a first step of implementation of this method, an attachment zone (120) is placed at the top of the tool. The extent of this attachment zone is smaller than the surface of the tool. Represented as a continuous strip in this exemplary embodiment, said attachment zone is, in an alternative exemplary embodiment (not shown), made up of attachment segments on the surface of the tool. Said attachment zone (120) is intended to maintain the link between the attachment film of the first laying up ply of the preform and the tool, at the same time making it easier to separate the film from the tool after laying up. As a non-limitative example, said attachment zone (120) is made up of a double-sided adhesive tape that is sensitive to pressure. In another embodiment, said attachment zone (120) is a mechanical part joined to the tool (100), for example using a key system, the surface of which is treated to allow the adhesion of the polymer deposited by additive manufacturing. In a second step, polymer is deposited on the laying up surface (101) by means of an additive manufacturing method, wherein depositing starts in the attachment zone. Different additive manufacturing techniques may be used to that end; as a non-limitative example, said attachment film is deposited using a technique of spraying thermoplastic polymer powder that is melted by a laser source. In an exemplary embodiment, said polymer is deposited in the form of lines (131, 132) or narrow strips to form a net so as to cover the laying up surface (101) of the tool. The mesh size of the net is adapted according to the shape and the laid up fiber. The lines (131) or strips fixed to the attachment zone (120) are deposited first, followed by the other lines (132) or strips, joined to the first ones (131). Said strips (131, 132) or lines do not adhere to the laying up surface (101) of the tool, which surface (101) is prepared to that end.

In this exemplary embodiment, this thermoplastic polymer net is used to anchor the first ply deposited by laying up during the third step of the method according to the invention. Thus, the pre-impregnated or dry fibers deposited by placing fibers during the third step adhere to the net as a result of the thermal activation of the polymer deposited using additive manufacturing. Such thermal activation is achieved by heating said polymer to a temperature sufficient to make it tacky, generally a temperature between the glass transition temperature and the melting temperature of said polymer. Said thermal activation is achieved using any means known in the prior art and compatible with the nature of the laid up fiber, for example, by mechanical contact with a heated surface, blowing hot air, laser, microwave or induction, but these examples are not exhaustive. In these last two examples of thermal activation means, the laying up surface (101) of the tool is advantageously treated to react to electromagnetic radiation in the appropriate wavelength. In another exemplary embodiment, the polymer forming the net is combined, at the time of deposition using additive manufacturing, with a phase sensitive to electromagnetic radiation, for example ferrite powder. After the first ply is attached, the laying up of the fibrous preform continues using the laying up techniques known in the prior art. When the preform is laid up, it is then removed by separating the attachment zone (120) from the attachment film. Said attachment film or the net in this exemplary embodiment remains stuck to the preform. Alternatively, said attachment film is removed from the surface of the preform using machining or abrasion.

Figure 2:
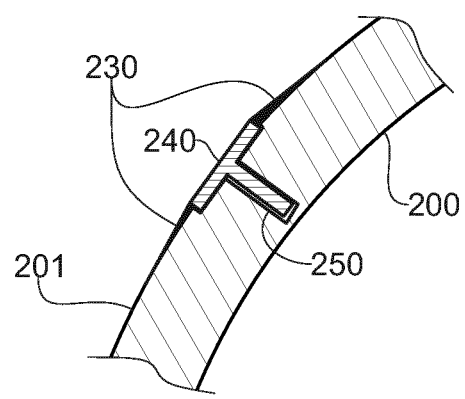
FIG. 2 is a partial sectional view of another exemplary implementation of the method according to the invention on a tool comprising a recess for a stiffener.

In FIG. 2 of another exemplary implementation of the method according to the invention, the tool (200) comprises means (250) to hold a stiffener (240), the sole of which projects out in relation to the laying up surface (201). In this implementation, the method according to the invention comprises a step of creating, using additive manufacturing, gradual geometric transition zones (230) between the edges of the sole and the laying up surface (201) of the tool. The gradual raising made possible by the transition zones enables the deposited fibers to follow that rise, at the same time keeping them in contact in all locations with the preform or said transition zones.

The description above and the exemplary embodiments show that the invention achieves the objectives sought; in particular, it makes it possible to automatically make an attachment layer for the first ply on a forming tool in order to make a preform by laying up, particularly by placing fibers.

The invention claimed is:

1. A method for making a first ply of a fibrous preform on a tool, comprising steps of:
    making an attachment zone on a laying up surface of the tool, the attachment zone being within the laying up surface of the tool;
    depositing a polymer by an additive manufacturing on the laying up surface of the tool, wherein said polymer is deposited on the attachment zone; and
    activating tackiness of the polymer deposited using said additive manufacturing and laying up the first ply, so as to make deposited fibers of the first ply adhere to the polymer deposited by said additive manufacturing.

2. The method according to claim 1, wherein the attachment zone is mechanically connected to a mold and comprises a surface suitable for adhesion of the polymer deposited by said additive manufacturing.

3. The method according to claim 1, wherein the attachment zone comprises a pressure-sensitive adhesive.

4. The method according to claim 1, wherein the polymer deposited by said additive manufacturing is a thermoplastic polymer.

5. The method according to claim 4, further comprising a step of heating during the laying up step to activate the tackiness of the polymer deposited by said additive manufacturing.

6. The method according to claim 5, wherein the laying up surface of the tool is made of a material that does not adhere to the polymer deposited by said additive manufacturing.

7. The method according to claim 1, wherein the laying up surface of the tool is convex and the attachment zone is located at a top of the tool.

8. The method according to claim 1, wherein the laying up surface of the tool is concave and the attachment zone is located at a bottom of the tool.

9. The method according to claim 1, wherein the depositing step deposits the polymer in strips organized to form a net on the laying up surface of the tool.

10. The method according to claim 7, wherein the tool comprises a recess to introduce a stiffener, a sole of the stiffener projects out in relation to the laying up surface of the tool, and the method further comprises a step of using additive manufacturing to form a gradual geometric transition zone between a top of the sole of the stiffener and the laying up surface of the tool.

\* \* \* \* \*